April 3, 1956 L. H. FLORA 2,740,505
JOINT FOR ROOFING, WALL, FLOOR, OR THE LIKE
Filed Sept. 22, 1952
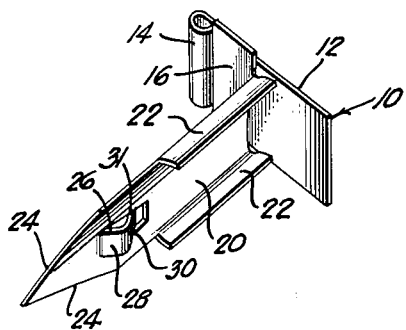
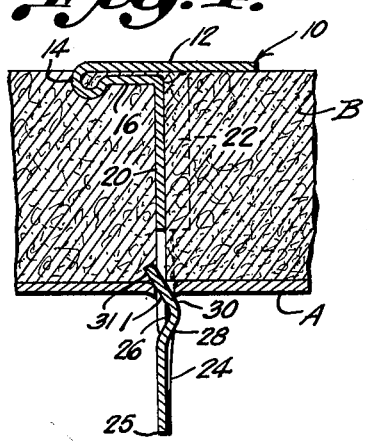
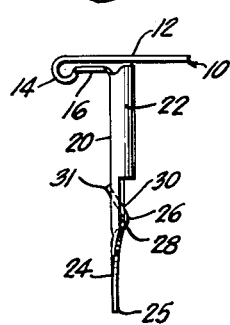
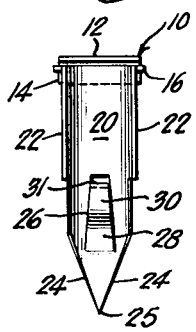
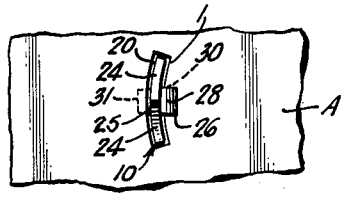
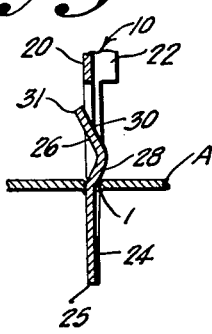
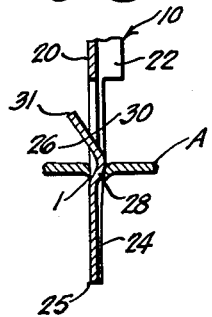
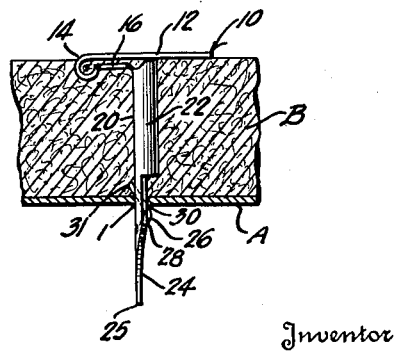
Inventor
LAURENCE H. FLORA
By
H. J. Lombard
ATTORNEY

United States Patent Office 2,740,505
Patented Apr. 3, 1956

2,740,505

JOINT FOR ROOFING, WALL, FLOOR, OR THE LIKE

Laurence H. Flora, Cleveland, Ohio, assignor to Tinnerman Products, Inc., Cleveland, Ohio, a corporation of Ohio Application September 22, 1952, Serial No. 310,841

1 Claim. (Cl. 189—36)

This invention deals with an improved construction for a sheet metal roofing nail for use in insulated roofing structures and the like in which the nail is driven into a thickness of sheet steel or other sheet metal included in the deck or wall of a structure to secure a pad or layer of insulation or similar material thereto.

Heretofore, the usual roofing nail intended to be driven into sheet metal deck or wall actually served as little more than a prong adapted to cut a passage in the sheet metal and be retained therein merely by frictional engagement with the marginal edge of the passage, and possibly slightly added resistance provided by roughened surfaces on the shank of the nail. Due to weather conditions, vibration, etc., it is well known that such roofing nails frequently work loose and often result in unsatisfactory installations.

A primary object of this invention is to provide an improved sheet metal roofing nail having a special construction for effecting a positive lock in the sheet metal deck or wall in which it is driven such that the nail is permanently retained in its initial tightened fastening position against loosening or displacement under the most severe service conditions, and further, in a manner whereby the nail is automatically positively locked in such tightened fastening position.

In insulated roofing and wall constructions, the usual insulation is made in sizeable pads of material which is relatively soft and porous and somewhat compressible such that the average pad of insulation frequently varies slightly in thickness and it is otherwise difficult to drive the roofing nails to an exact depth in such relatively soft and porous material in all instances. Another object of the invention, therefore, is to provide a sheet metal roofing nail, or the like, having a special construction providing for a positive locking of the nail in applied position, as aforesaid, and with said locking means adapted to compensate for variations and irregularities in the thickness of the insulation pad or similar material so that the positive locking of the roofing nail is fully effective despite any such variation or irregularity in the thickness of the insulation or when the roofing nail is driven home to a slightly greater depth than necessary.

A further object of the invention is to provide a roofing nail, as aforesaid, in which the positive locking means is in the form of an integral tongue construction stamped in the sheet metal shank of the roofing nail to provide a cam type locking shoulder adapted to engage the marginal edge of the passage in the sheet metal deck or wall in a positive locking action at the most effective point on said cam shoulder depending on the thickness of the area of insulation secured by the nail.

Another object of the invention is to provide a sheet metal roofing nail, as just described, having a special tongue construction integrally provided on the shank of the nail which defines a cam type locking shoulder adapted for positive locking engagement with one side of the passage cut into the sheet metal deck or wall in which the nail is driven, and with the extremity of said tongue defining a projecting tab engaging the opposite side of said passage to force said cam shoulder into said positive locking engagement in applied position.

A further object of the invention is to provide a sheet metal roofing nail embodying the foregoing features and characteristics together with reinforcing means for the head and shank of the nail, and further, with the head of the nail comprising a highly simplified construction defined by a return bent portion formed integrally with the shank of the nail and providing a strong, durable and reliable one-piece article of manufacture which is admirably suited for economical quantity production at relatively low cost.

Further objects and advantages, and other new and useful features in the construction, arrangement and general combination of elements of the improved roofing nail of the invention will be readily apparent as the following description proceeds with reference to the accompanying drawings, for purposes of illustration but not of limitation, in which like reference characters designate like parts throughout, and in which:

Fig. 1 is a perspective view of the improved sheet metal roofing nail in accordance with the invention;

Fig. 2 shows the roofing nail in edge elevation on a smaller scale;

Fig. 3 is a side elevational view of the roofing nail as seen from the right of Fig. 2;

Fig. 4 is a sectional view of a typical roofing installation in which a pad or layer of insulation is secured to a sheet steel deck, or the like, by the improved roofing nail of the invention, the nail being shown in section as driven into said sheet metal deck and positively locked in fully applied position;

Fig. 5 is a bottom view of Fig. 4 illustrating the reinforced curved contour of the shank of the roofing nail and shows the point and pilot portion of the nail as driven through the sheet metal deck with the cam type locking shoulder positively locking the nail in final position;

Fig. 6 is a fragmentary sectional view of the leading end of the roofing nail as driven to pierce and cut a passage or hole in the sheet metal deck and shows the initial outwardly projecting relation of the tongue on the shank immediately prior to entering said passage;

Fig. 7 is a fragmentary sectional view similar to Fig. 6 showing the inward flexing of the tongue toward the shank as it enters the passage or hole in the sheet metal deck; and Fig. 8 is a sectional view of a roofing installation similar to Fig. 4, but on a smaller scale, and with the roofing nail shown in edge elevation as full applied and locked in final fastening position.

Referring now, more particularly, to the drawings, Fig. 4 shows a typical roofing installation in which a layer or pad of insulation B is secured to a sheet metal or sheet steel deck A forming the primary support or base of a roof or wall. The sheet metal or sheet steel deck A defines a panel like surface on which the layer of insulation B in the form of pads or padding, or the like, is secured by the improved roofing nails of the invention driven through said insulation and through the sheet metal or steel deck A to positively locked fastening position substantially as shown in Fig. 4.

The sheet metal roofing nail, designated generally 10, is advantageously provided in a relatively simple construction adapted for economical quantity production at relatively low cost. The roofing nail preferably is provided from spring steel or cold rolled steel having spring characteristics and the gauge of which is selected according to service requirements and the predetermined thickness of the parts to be secured. The sheet metal roofing nail is most effective when provided of spring steel suitably heat treated to provide the desired toughness and hardness, and is readily constructed from a relatively small inexpensive strip of such spring steel which may be readily obtained from standard strip stock with little loss or waste of material. The sheet metal blank provided by such a strip of spring steel has one end thereof bent to define a generally T-shaped head formation comprising an outer continuous substantially flat head portion 12 which, of course, may be of any desired length. A return bend in the nature of an enlarged loop 14 is provided at one end of said substantially flat head 12 in projecting relation to the underside thereof and is adapted to embed in the layer of insulation B when the head 12 of the nail is driven flush with the insulation B in the applied position of the nail. A return bent head portion 16 extends from the loop 14 in underlying relation to the outer head portion 12 and carries a strip portion 20 in generally normal relation thereto which forms the shank 20 of the roofing nail. The shank 20 of the roofing nail comprises a free end of the strip and therefore, may be provided in any necessary length depending on the length of the shank desired in the completed roofing nail. Preferably this underlying head portion 16 is disposed in close abutting relation to the underside of the head portion 12 to support and rigidify said head 12 in the driving of the nail. The opposite edge portions of the shank are provided with elongate extensions 22 which are bent outwardly from the body of the shank 20 to define longitudinal ribs 22, or the like. The upper ends of said ribs 22 are so formed as to engage the underside of the head portion 12 to serve as a reinforcing means acting in conjunction with the underlying head portion 16 to support and bolster said head 12 in the driving of the nail.

The elongate ribs 22 serve to stiffen and rigidify the shank 20 of the nail in the manner of a channel shape and the body of the shank 20 is curved, as seen in Fig. 5, to provide the shank in a corrugation which adds further to the stiffness and rigidity of the shank. The shank 20 of the roofing nail below the longitudinal ribs 22 is provided as a V-shaped or wedge type of pilot having sharp cutting edges 24, Fig. 3, diverging from a sharp piercing point 25 adapted to puncture readily the sheet metal deck or wall A.

A cam type of locking shoulder 30 is provided on the shank 20 of the roofing nail in a predetermined spacing from the head defined by portions 12, 16, depending on the known general size of the combined thickness of the sheet metal deck A and the layer of insulation B. The cam shoulder 30 is provided by a partially severed portion formed by an inverted U-shaped or generally V-shaped slit in the body of the shank 20, Fig. 3, defining an integral tongue 26 having a free end extending toward the head 12 of the nail. Said tongue 26 is bent outwardly out of the plane of said shank to one side thereof to provide a guide surface 28 inclined outwardly from the shank 20 and merging into a relatively large cam shoulder 30 inclined inwardly toward said shank 20 with the extremity 31 thereof extending through the cutout from which said tongue 26 is formed and presenting a pronounced tab, or the like, projecting beyond the opposite side of said shank 20 substantially as shown in Figs. 2 and 4.

The cam shoulder 30 is so provided on the shank 20 that when the nail is driven home, said cam shoulder 30 provides an automatic positive lock at an effective point in engagement with the marginal edge of the hole or passage 1 pierced and cut by the nail in the sheet metal deck A even though there is a variation or irregularity in the thickness of the layer or pad of insulation B. The head 12 of the nail must necessarily lie substantially flush with the outer surface of the insulation B for the application of overlying shingles or finishing materials, etc., and consequently, as a result of an inordinate compression on the insulation when the nails are driven home or other variation or irregularity in the thickness of the insulation B, the pointed ends 25 of the nails project at slightly different lengths beyond the undersurface of the steel deck A in their final position.

In providing the locking shoulder 30 in the form of a cam surface, such cam surface is adapted to engage the marginal edge of the passage 1 in the sheet metal deck A at any of several points along the length of said cam shoulder 30 depending on the position of said cam shoulder 30 when the nail is driven home. The cam shoulder 30, accordingly, engages the marginal edge of the hole or passage 1 in the sheet metal deck A at an effective point providing a positive lock of the nail in home position despite any slight variation or irregularity in the thickness of the insulation B either in the composition thereof or as a result of inordinate compression of the insulation when the nail is driven home.

The completed roofing nail 10, thus provided, is applied in the usual manner in driving the same by hammer blows on the head 12 of the fastener. In this regard, when the leading end of the nail is driven through the insulation B, the insulation serves to steady the nail such that the sharp point 25 of the nail readily pierces the sheet metal deck A in a quick and expeditious manner. Upon continued driving of the nail, the sharp cutting edges 24 of the V-shaped pilot easily cut the hole or passage 1 in the sheet metal deck A, Fig. 5, as necessary to pass the adjoining portion of the shank leading to the area of the tongue 26 formed with the outwardly inclined guide surface 28 merging into the inwardly inclined cam locking shoulder 30, as aforesaid. Fig. 6 illustrates the tongue 26 in its initial relation as the guide surface 28 thereof enters the hole or passage 1 in the sheet metal deck A. As the nail is driven further, said guide surface 28 is forced to cam against the adjacent edge of said passage 1 to thereby flex the tongue 24 inwardly toward and into the plane of the shank 20, as shown in Fig. 7, as necessary to permit said tongue 26 to pass through the hole or passage 1 to a position in which the cam shoulder 30 is opposite the marginal edge of the passage 1 adjacent thereto. In this position, said tongue 26 is movable outwardly from its inwardly flexed position shown in Fig. 7 to engage the marginal edge of the passage 1 and provide the positive lock of the nail in the hole or passage 1 at the most effective point in engagement with the edge of the passage 1 depending on the location of said cam shoulder 30 in the final position of the nail which, as explained, varies slightly because of irregularities or variations in the thickness of the insulation B or due to inordinate compression on the insulation when the nail is driven home.

The cam shoulder 30 provides an automatic positive locking of the nail in final position, and the purpose and function of the projecting tab 31 on the extremity of the tongue 26 is highly important in this regard. It will be understood that a roofing nail in accordance with the invention is necessarily constructed of relatively thick gauge metal and that the inward flexing of the locking tongue 26, Fig. 7, takes place, more particularly, by cold working or inward bending of said tongue 26 about its junction with said shank 20 when the guide surface 28 on the tongue cams against the adjacent edge of the passage 1 as shown in Fig. 7. Immediately following, the projecting tab 31 on the extremity of said tongue 26 engages the edge of the passage 1 opposite to that engaged by the guide surface 28, Fig. 4, so as to push and force the tongue 26 positively outwardly from the inwardly flexed position shown in Fig. 7 to the final locking position shown in Fig. 4 in which the cam shoulder 30 on said tongue 26 is disposed in a pronounced outwardly projecting relation in positive locking engagement in the passage 1.

The action is such that the projecting tab 31 engages the edge of the passage 1 adjacent thereto immediately following or simultaneously with the movement of the cam shoulder 30 into position for engaging the other edge of said passage 1, and accordingly, when the nail is driven home, said tab 31 produces a reverse cold working or outward bending of the tongue 26 about the junction thereof with the shank 20 to force said cam shoulder 30 outwardly to its pronounced outwardly projecting relation in positive locking engagement with the adjacent edge of the passage 1 in the final applied position of the nail, as shown in Fig. 4.

The cam shoulder 30 is thus automatically seated in positive engagement with the marginal edge of the hole or passage 1 in the sheet metal deck A in a manner which compensates for any discrepancy in the thickness of the area of the insulation B secured thereby. The fastening action is such that roofing nails in accordance with the invention are readily applied with an automatic positive locking action in final position in practically every instance, and in a manner whereby the roofing nails are permanently retained in their initial tightened relation with little danger of loosening or displacement under the most severe service conditions.

While the invention has been described in detail with a specific example, such example is intended as an illustration only inasmuch as the invention fully contemplates various modifications which may be provided without departing from the spirit and scope of the invention.

What is claimed is:

A joint comprising a sheet metal supporting part, a layer of material thereon, and a sheet metal nail securing said layer of material to said sheet metal part comprising a piece of sheet metal providing a head comprising an outer head portion having a free end and provided with a return bend connected to an underlying head portion of less length than said outer head portion and engaging the underside of said outer head portion, a substantially channel-shaped shank extending from said underlying head portion in generally normal relation to said head and having a V-shaped pilot portion on its lower end providing cutting edges diverging from a point, said sheet metal supporting part having a passage pierced and cut therein by said point and pilot portion, said substantially channel-shaped shank extending through said layer of material and through said passage in said sheet metal supporting part, said substantially channel-shaped shank being curved transversely substantially in the form of a longitudinal corrugation comprising a longitudinal wall having substantially concave and convex surfaces with the longitudinal edge portions of said shank defining longitudinal ribs reinforcing said shank, said longitudinal ribs having their upper ends in engagement with the underside of said outer head portion and bolstering said outer head portion in cooperation with said underlying head portion, said longitudinal wall having an inverted substantially U-shaped slit between said head and pilot portion defining an opening in said longitudinal wall and a tongue in said opening having a free end extending toward said head, said tongue extending outwardly from the concave surface of said longitudinal wall and comprising a guide portion inclined outwardly and upwardly from adjacent the junction of said tongue with said longitudinal wall and merging with the free end portion of said tongue, said free end portion of the tongue being inclined upwardly and inwardly toward the concave surface of said lonigtudinal wall in a cam shoulder projecting from said concave surface of said longitudinal wall with the extremity of said tongue extending through said opening in said longitudinal wall and defining a projecting tab projecting from the opposite convex surface of said longitudinal wall, said cam shoulder being so spaced from the head of the nail that it extends beyond the combined thickness of said layer of material and said sheet metal part and projects through said passage in said sheet metal part in anchored engagement with the adjacent marginal portion of said passage at the underface of said sheet metal part, said projecting tab on the extremity of said tongue engaging the opposite marginal portion of said passage at the opposite face of said sheet metal part and thereby forcing said cam shoulder outwardly in a positive lock in said anchored engagement thereof in said passage.

References Cited in the file of this patent

UNITED STATES PATENTS

| | | |
|---|---|---|
| 727,111 | Duffy | May 5, 1903 |
| 1,119,686 | Davis | Dec. 1, 1914 |
| 2,155,893 | Fulton | Apr. 25, 1939 |
| 2,244,975 | Tinnerman | June 10, 1941 |
| 2,319,058 | Hansman | May 11, 1943 |
| 2,391,298 | Davis | Dec. 18, 1945 |